United States Patent Office 2,844,608
Patented July 22, 1958

2,844,608
SULFODICARBOXYLIC ACID COMPOUNDS

Walter Hagge and Mathieu Quaedvlieg, Leverkusen-Bayerwerk, and Herbert Hempel, Leverkusen, Germany, assignors to Farbenfabriken Bayer Aktiengesellschaft, Leverkusen, Germany, a corporation of Germany No Drawing. Application January 25, 1954
Serial No. 406,064

Claims priority, application Germany January 26, 1953

6 Claims. (Cl. 260—401)

The present invention relates to sulfodicarboxylic acid compounds; more particularly it concerns new sulfodicarboxylic acid compounds of the general formula

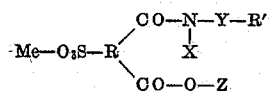

wherein Me is hydrogen or a base and R is an aliphatic carbon chain, whereas X is hydrogen or an alkyl group, Y stands for the —CO— or —SO$_2$— radical, R' is a hydrocarbon radical of higher molecular weight and Z is an alkyl group.

These compounds may be prepared in various ways, for instance by reacting an unsaturated dicarboxylic anhydride, preferably maleic anhydride, at elevated temperature with an amide of carboxylic or sulfonic acids of higher molecular weight at a molecular ratio of 1:1, esterifying the reaction product with an alcohol such as butyl, amyl, hexyl, octyl or 2-ethyl-hexyl alcohol, and treating it with an alkali bisulfite, such as sodium, potassium or ammonium bisulfite.

Suitable amides of carboxylic or sulfonic acids of higher molecular weight are for instance the amides of caprylic acid, lauric acid or stearic acid and the amides of sulfonic acids obtained by sulfochlorinating hydrocarbons having 6 to 18 carbon atoms and subsequently reacting the sulfochlorides obtained with ammonia or an alkyl amine.

The new sulfodicarboxylic acid compounds of the present invention have proved to be very useful wetting agents in alkaline medium. They are distinguished over known wetting agents of the type of the sulfosuccinic acid diesters since they do not lose their wetting power in hot alkaline solutions. Particularly useful wetting agents are sulfodicarboxylic acid compounds derived from amides of such sulfonic acids as are obtained by sulfochlorination of hydrocarbons of higher molecular weight. This is presumably due to the fact that the sulfonic acid group is distributed over the whole chain of the hydrocarbons so that the latter is branched in a manner which enhances the wetting power of the compound.

The new compounds are applied as wetting agents in the usual manner. Suitable processes for producing them are described in the following examples which, however, do not limit the scope of the invention. The parts given are by weight.

Example 1

49 parts of maleic anhydride are added at about 25° C. to 146 parts of an amide obtained by sulfochlorinating a mixture of hydrocarbons boiling between 250 and 320° C. and subsequently reacting the product obtained with ammonia. After heating the reaction mixture to 100° C. for one hour, 75 parts of 2-ethyl-hexanol, 150 parts of toluene and 1 part of sulfuric acid are added and the mixture is heated to the boil in a distilling apparatus. The mixture distilling off, which consists of toluene and water, is condensed and the toluene lead back to the distilling apparatus. After the esterification is complete the solvent is distilled off without residue, at last in vacuo. 160 parts of sodium bisulfite solution (40%) and about 8 parts of sodium hydroxide solution (45%) are added and the mixture is boiled under reflux until the reaction product has become water-soluble. After distilling off the reaction product is obtained in the form of a yellowish brown colored paste.

In the following table the amount of grams per liter are indicated, which are necessary to obtain a wetting time of 100 seconds:

|  | cold | | hot (75° C.) | |
| --- | --- | --- | --- | --- |
|  | neutral | alkaline | neutral | alkaline |
| Sulfosuccinic acid dioctyl ester | 0.29 | inactive | 0.23 | inactive. |
| Product of the example | 0.40 | 0.92 | 0.15 | 0.91. |

Example 2

105 parts of the amide obtained by sulfochlorinating a mixture of hydrocarbons boiling between 180 and 210° C. and subsequently reacting the product obtained with ammonia is contacted with 49 parts of maleic anhydride at 100° C. After the addition of 75 parts of 2-ethyl-hexanol, 150 parts of toluene and 1 part of concentrated sulfuric acid the mixture is heated under reflux for about 6 hours while the water formed during the reaction is continuously removed. The toluene is distilled off without residue and the reaction product rendered water soluble by boiling with 160 parts of sodium bisulfite solution (40%) and about 7 parts of sodium hydroxide solution (45%); after evaporating the water the product is obtained in the form of viscous paste of high wetting power.

Example 3

200 parts of coconut fatty acid amide are melted together with 98 parts of maleic anhydride at 100° C. and kept at this temperature for one hour. Thereupon 150 parts of octyl alcohol, 300 parts of toluene and 2 parts of concentrated sulfuric acid are added. By boiling under reflux the esterification is completed with continuous removal of the water formed in the reaction. After distilling off the solvent 300 parts of sodium bisulfite solution (40%) and 10 parts of sodium hydroxide solution (45%) are added and the mixture is boiled under reflux until the reaction product has become water soluble. Finally, the water is distilled off and the reaction product obtained in the form of a viscous paste of high wetting power.

Instead of octyl alcohol there may be used an equal amount of those alcohols prepared by reduction of fatty acids containing 4 to 10 carbon atoms, which are obtained as the forerun in the distillation of paraffin oxidation products.

We claim:

1. Sulfodicarboxylic acid compounds of the general formula

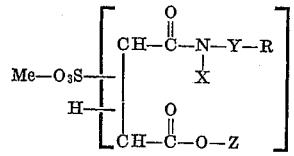

wherein Me is a member of the group consisting of an alkali metal and the ammonium radical, X is a member of the group consisting of hydrogen and an alkyl group, Y is a member of the group consisting of the

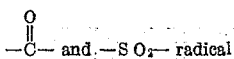

R is an alkyl group of 6–18 carbon atoms and Z is a lower alkyl group.

2. Sulfodicarboxylic acid compounds of the general formula

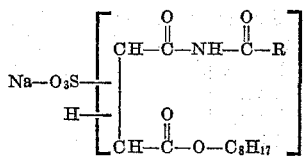

wherein R is an alkyl group of 6–18 carbon atoms.

3. Sulfodicarboxylic acid compounds of the general formula

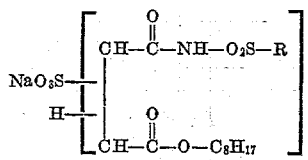

wherein R is an alkyl group of 6–18 carbon atoms.

4. Process for the production of sulfocarboxylic acid compounds of the general formula indicated in claim 1, which comprises reacting maleic anhydride of the formula

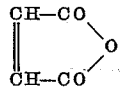

at elevated temperature with an amide of a member of the group consisting of aliphatic carboxylic and sulfonic acids containing an alkyl group of 6–18 carbon atoms at a molecular ratio of 1:1, esterifying the reaction product with a saturated lower alkanol and contacting the esterified product with an alkali bisulfite.

5. Process of claim 4 wherein the amide is a carboxylic acid amide containing a 6–18 carbon alkyl group, and the esterifying alcohol is an octyl alcohol.

6. Process of claim 4 wherein the amide is a sulfonic acid amide containing a 6–18 carbon alkyl group, and the esterifying alcohol is an octyl alcohol.

References Cited in the file of this patent

UNITED STATES PATENTS

| | | |
|---|---|---|
| 2,184,794 | De Groote | Dec. 26, 1939 |
| 2,252,401 | Jaeger | Aug. 12, 1941 |
| 2,386,445 | De Groote | Oct. 9, 1945 |

OTHER REFERENCES

Fieser and Fieser: Organic Chemistry, 1944, page 243.

Schwartz and Perry: Surface Active Agents, 1949, pages 40, 106.

"Synthetic Organic Chemistry," by Wagner and Zook (copyright 1953), page 576, No. 372.